United States Patent
Ratliff et al.

(10) Patent No.: US 7,451,045 B2
(45) Date of Patent: Nov. 11, 2008

(54) METHOD AND SYSTEM FOR PROVIDING TRAVEL DIRECTION ANNOTATIONS OVER A NETWORK

(75) Inventors: Emily Jane Ratliff, Austin, TX (US); Kimberly DaShawn Simon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 11/333,507

(22) Filed: Jan. 17, 2006

(65) Prior Publication Data

US 2007/0168112 A1   Jul. 19, 2007

(51) Int. Cl.
  *G01C 21/34* (2006.01)
  *G08G 1/0968* (2006.01)
(52) U.S. Cl. ............ 701/210; 701/211; 340/995.1; 340/995.13; 340/995.24; 707/1; 707/5; 709/217
(58) Field of Classification Search ............ 701/209, 701/211; 340/995.1, 13, 24, 27; 707/5
  See application file for complete search history.

(56) References Cited

U.S. PATENT DOCUMENTS

| | | | | |
|---|---|---|---|---|
| 5,543,789 | A * | 8/1996 | Behr et al. | 340/995.12 |
| 5,802,492 | A * | 9/1998 | DeLorme et al. | 455/456.5 |
| 6,687,608 | B2 * | 2/2004 | Sugimoto et al. | 701/207 |
| 6,853,913 | B2 * | 2/2005 | Cherveny et al. | 701/208 |
| 7,071,842 | B1 * | 7/2006 | Brady, Jr. | 340/988 |
| 2001/0007968 | A1 * | 7/2001 | Shimazu | 701/211 |
| 2002/0161518 | A1 * | 10/2002 | Petzold et al. | 701/210 |
| 2006/0195799 | A1 * | 8/2006 | Sawyer | 715/853 |
| 2007/0150175 | A1 * | 6/2007 | Shen et al. | 701/200 |
| 2007/0233551 | A1 * | 10/2007 | Levy et al. | 705/10 |

OTHER PUBLICATIONS

Dybwad, "engadget, How-To: Make your own annotated multimedia Google map", http://www.engadget.com/entry/1234000917034960/ retrieved Oct. 12, 2005, pp. 1-30.
"Maps PowerView", Dec. 2002, pp. 1-10.
"My childhood, seen by Google Maps", http://flickr.com/photos/mathowie/8496262/ , retrieved Oct. 12, 2005, pp. 1-7.

* cited by examiner

*Primary Examiner*—Thomas G. Black
*Assistant Examiner*—Lin B Olsen
(74) *Attorney, Agent, or Firm*—Duke W. Yee; Jeffrey S. LaBaw; James O. Skarsten

(57) ABSTRACT

A method and system is provided for providing and storing annotations that pertain to travel directions to a particular destination, the annotations generally including ratings of the accuracy of the directions and errors observed in the directions by prior users. Annotations submitted by users are stored in a central repository, for access by those who subsequently become interested in the directions or the particular destination. A useful embodiment of the invention is directed to a method for providing travel directions over a selected network, wherein a request for directions regarding a specified destination is sent from a requester to a Directions Provider. The Provider retrieves the requested directions and furnishes them to the requestor. The method further includes generating annotations associated with the furnished directions in accordance with a set of rules resulting from one or more decisions made by the requester, and sending the annotations to the requester. The requestor then selectively provides annotations regarding the furnished directions to a central repository.

3 Claims, 3 Drawing Sheets

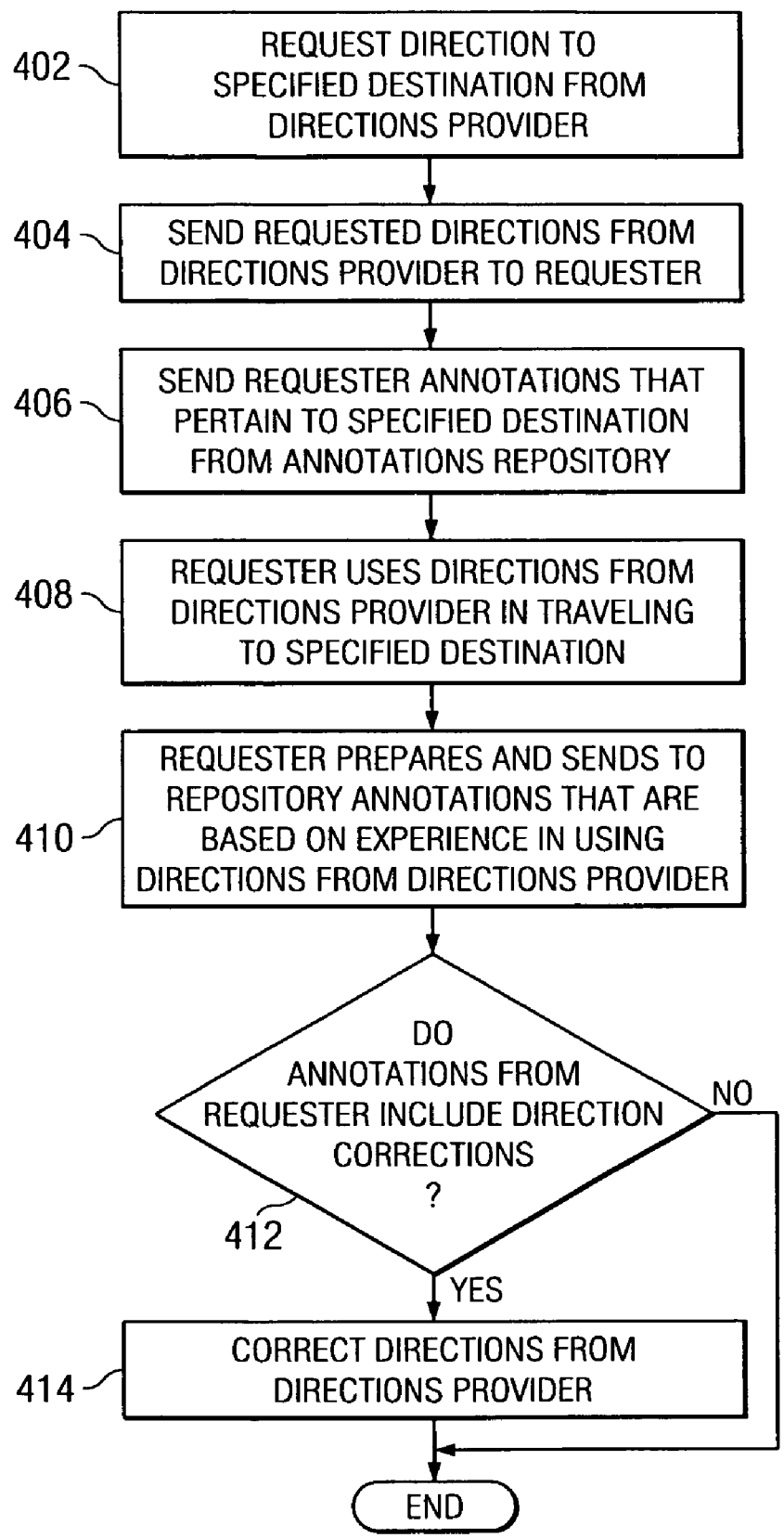

METHOD AND SYSTEM FOR PROVIDING TRAVEL DIRECTION ANNOTATIONS OVER A NETWORK

BACKGROUND OF THE INVENTION

1. Field of the Invention

The invention disclosed and claimed herein generally pertains to a method for furnishing travel directions over a network such as the Internet, wherein the directions are accompanied or supplemented by annotations from prior recipients of the directions. More particularly, the invention pertains to a method of above type wherein a person requesting directions, after using them, is able to send pertinent annotations to a central repository. Even more particularly, the invention pertains to a method of the above type wherein the requestor is able to participate in establishing rules pertaining to annotations that are stored in and retrieved from the central repository.

2. Description of the Related Art

At present, a number of Internet sources are available that provide directions for use in locating or traveling to a specified destination. These sources, such as a source accessible at mapquest.com, typically provide directions in textual form, or in graphic form such as maps or the like. However, directions from these sources may sometimes be inaccurate, due to road construction after the directions were created, recent changes in road signs, or for other reasons. As a result, a user following the directions could easily become confused or lost, and waste time in trying to reach an intended destination. Moreover, the user could inadvertently end up in an unsafe environment, or could become significantly accident prone in driving around unfamiliar areas without accurate guidance.

The Internet currently offers services that allow users of certain types of products to send annotations, such as ratings or comments regarding the products, to a central database or repository. This is done, for example, in connection with certain movie services. After receiving and viewing a movie from the service, ratings indicating a user's opinion of the movie, as well as the user's over-all satisfaction with the service, can be sent to a service website. The website can then be accessed by other persons interested in the movie, who want to know how it was rated by others. Capabilities of this type, however, are generally not available in connection with services that provide travel directions. Moreover, such services typically do not allow users to dynamically access directions based on rules or search criteria.

It would be beneficial to enable users of a travel direction service to submit annotations, in regard to directions they receive, to a central database or repository at an Internet website. Such annotations could include ratings of the accuracy of the received directions, and could further include suggestions for correcting observed errors. Annotations could be submitted, for example, in the form of text or as voice recordings. Submitted annotations regarding a particular destination could then be accessed later, by others who were interested in the destination. It would also be desirable to allow a user of the repository to participate in establishing rules regarding his or her use of annotations in the repository.

SUMMARY OF THE INVENTION

The invention provides a mechanism for receiving annotations, wherein the annotations pertain to travel directions for a particular destination or location. The annotations generally include information such as ratings of the accuracy of a particular set of directions, errors observed by prior users of the directions, and other comments of interest. Annotations may be submitted as written text or as voice recordings. Submitted annotations are stored in a central repository or database, and can thus be accessed by others who subsequently become interested in the directions or in travel to the same destination. Moreover, the mechanism of the invention enables users of the repository to dynamically access directions and associated annotations based on rules and search criteria such as ratings, the submitters of annotations, and the service provider. As a result, such users are able to discover better directions from others who have traveled to the same destinations. One useful embodiment of the invention is directed to a method for providing travel directions over a selected network. The method includes the step of sending a request for directions regarding a specified destination from a requestor to a directions providing service. The service retrieves the requested directions and furnishes them to the requester. The method further includes generating annotations associated with the furnished directions in accordance with a set of rules resulting from one or more decisions made by the requestor, and sending the annotations to the requester. The requestor then selectively provides annotations regarding the furnished directions to a central database or repository.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flow chart depicting steps in an embodiment of the invention.

DETAILED DESCRIPTION OF THE PREFERRED EMBODIMENT

Figure 1:
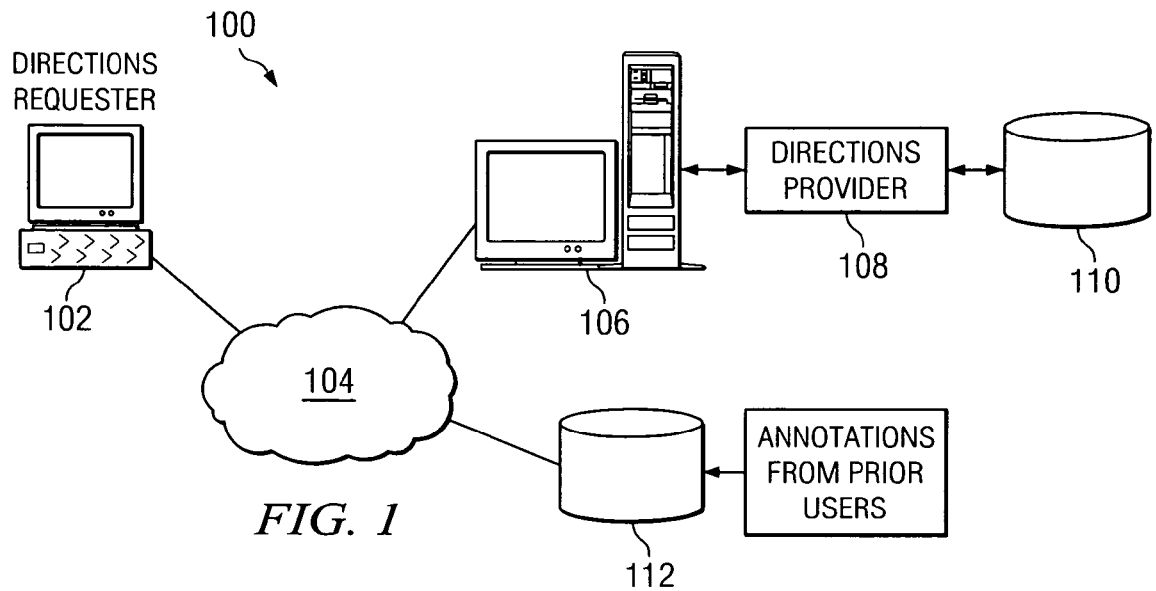
FIG. 1 is a block diagram of a system in which an embodiment of the invention may be implemented.

Referring to FIG. 1, there is shown a system 100 having a client computer or work station 102 that may be used by a requester, wherein the requestor is seeking directions for use in reaching a particular location or destination. To obtain the directions, typically from a specified starting location, the requestor submits a request therefor over the Internet 104. The request is submitted by appropriate operation of computer 102, and is directed to a pre-selected website known to be a source for directions of the type desired. The request is routed over Internet 104 to a server 106, and directed thereby to an intended Directions Provider 108. Direction types could include, without limitation, directions for traveling on highways, subways and other types of mass transit.

Upon receiving the directions request, the Directions Provider 108 retrieves the directions if they are immediately available, such as from a database 110 or the like. Alternatively, associated geographic information is obtained from database 110, and the information is selectively processed to create the requested directions. Typically, the directions would be referenced from a starting point indicated by the request, or by major highways that are in the general vicinity of the destination. Once available, the directions are transmitted by means of server 106 to the requestor computer station 102.

In a useful embodiment of the invention, the directions sent out from Directions Provider 108 are accompanied by annotations relating to the directions. Alternatively, the directions may be accompanied by a web site link or other information for directing the requester to such annotations. As described hereinafter in further detail, annotations would be furnished to the requester in accordance with rules that the requester has participated in generating.

Generally, the annotations comprise information that is submitted by prior users of the same directions as are furnished to the requester by Provider 108, or is submitted by previous travelers to the requestor's destination. One type of annotation could be prior user ratings of the furnished directions. Such ratings would provide numerical evaluations of characteristics such as accuracy of the directions, completeness and comparative ease in following the directions. Another type of annotation would be comments of prior users that set forth important corrections. Such comments could indicate, for example, that a street name had changed after the directions were created. A further type of annotation would be in the nature of helpful comments, to supplement the directions or make them easier to follow. For example, a comment of this type could indicate that it was a good idea to move into the left lane of a multi-lane highway as soon as possible, to prepare for a necessary turn at times when the highway was heavily congested with traffic. Annotations would be usefully submitted and recorded as written text, or by recording spoken words.

It is to be understood that comments could also be submitted regarding previous comments of other users. For example, user A could comment that a particular road is currently under construction. Six months later, user B would state that the comment of user A was no longer relevant. Clear and express comments of this type would be very helpful to users of the particular road.

In a further useful embodiment, annotations from prior users are directed to and retained in a central repository 112 that is set up and controlled by the Directions Provider 108. This arrangement allows the Directions Provider to efficiently update a given set of directions, upon receiving annotative corrections from users thereof. Such annotations could include, for example, corrected exit numbers, detours, streets and highways. The Directions Provider 108 can also process the ratings received from different users of the directions, to provide an average or over-all accuracy rating. The rating average can then be furnished to the requester along with a corresponding set of directions. Moreover, the requester may be allowed to access relevant ratings and comments that were previously submitted to repository 112.

In an alternative embodiment, the central repository 112 would be under control of an entity that is separate and independent from Directions Provider 108. One seeking directions to a particular destination may also dynamically access central repository 112 by searching the particular destination, or by searching possible major routes that could be traveled to reach the particular destination.

In a further embodiment, a Direction Provider could be a car rental agency. At present, certain car rental companies use a computer to calculate and print directions based on user input. The user then receives the directions, along with a rental car. Frequently, these directions are not accurate. Thus, it would be very helpful to have those who rent cars provide annotations to such directions, based on their experiences.

After using a set of directions furnished by the Directions Provider 108, the requester may decide to submit annotations to repository 112 based on his or her own experience with the directions. The submitted annotations could include numerical ratings of the furnished directions, as described above, corrections of observed errors or other relevant comments. Usefully, Directions Provider 108 would act to update or correct directions immediately, or in real time, upon receiving corrections thereto submitted by the requestor or other directions users. In some embodiments, a correction to a set of directions could be made available in real time to current users. For example, a service such as GPS could be connected into the repository 112, in order to inform users of a correction that had just been entered into the repository. If relevant comments were provided by voice recordings, the GPS system could include an in-car direction device that drove a speaker. The speaker could then be operated to provide the comments as voice recorded observations.

As a useful feature, one who submits annotations to repository 112 is given the opportunity to restrict access to his or her annotations. For example, the submitter may limit access to such annotations only to specified individuals or entities.

As a further feature of embodiments of the invention, a user of travel directions who needs to obtain directions periodically is able to establish a profile with Directions Provider 108. In connection with the profile, the user is able to store previously used directions for later use. The user can also select rules or a set of rules that pertain to storage and retrieval of directions and annotations. In accordance with one rule, for example, a particular set of annotations would be added to stored directions only if the annotations gave the accuracy of the directions a very high rating, such as at least 90 percent, and the submitter of the annotations was a particular individual known to the user. Another rule would specify that certain directions would remain stored in a Directions Provider database, or would be retrieved for the user, only if the average rating of the directions was no less than a certain level, such as 90 percent.

The user would be able to add or modify rules of the above type as he or she desired. If the user opted to set no rules, a default set of rules provided by the Directions Provider could be put into effect. The user's profile could also include pertinent elements such as trusted submitters, types of directions, a listing of specific websites that provide directions, and a listing of services to access and input ratings and other annotations pertaining to travel directions.

A user profile could also be adapted to accommodate persons interested in traveling by means such as motorcycle, bicycle or walking. For example, a detour that would be of little concern to a person driving a car could be extremely dangerous for someone operating a motorcycle. It would therefore be very beneficial for a motorcycle operator to be profiled to receive information regarding the detour.

In yet a further embodiment, annotations in the form of voice recordings could be sent to computer station 102 as podcasts. Audio files containing the voice recordings could then be downloaded, and listened to using either the computer 102 or a portable audio player such as an ipod or MP3 player. A portable audio player could be particularly useful for a person who liked to travel by walking or by bicycle or motorcycle. Such users could upload travel directions of interest to his or her ipod or other audio player, and then play back directions with voice annotations. A user could also be notified when updates become available to directions the user previously uploaded into his or her digital audio player.

Figure 2:
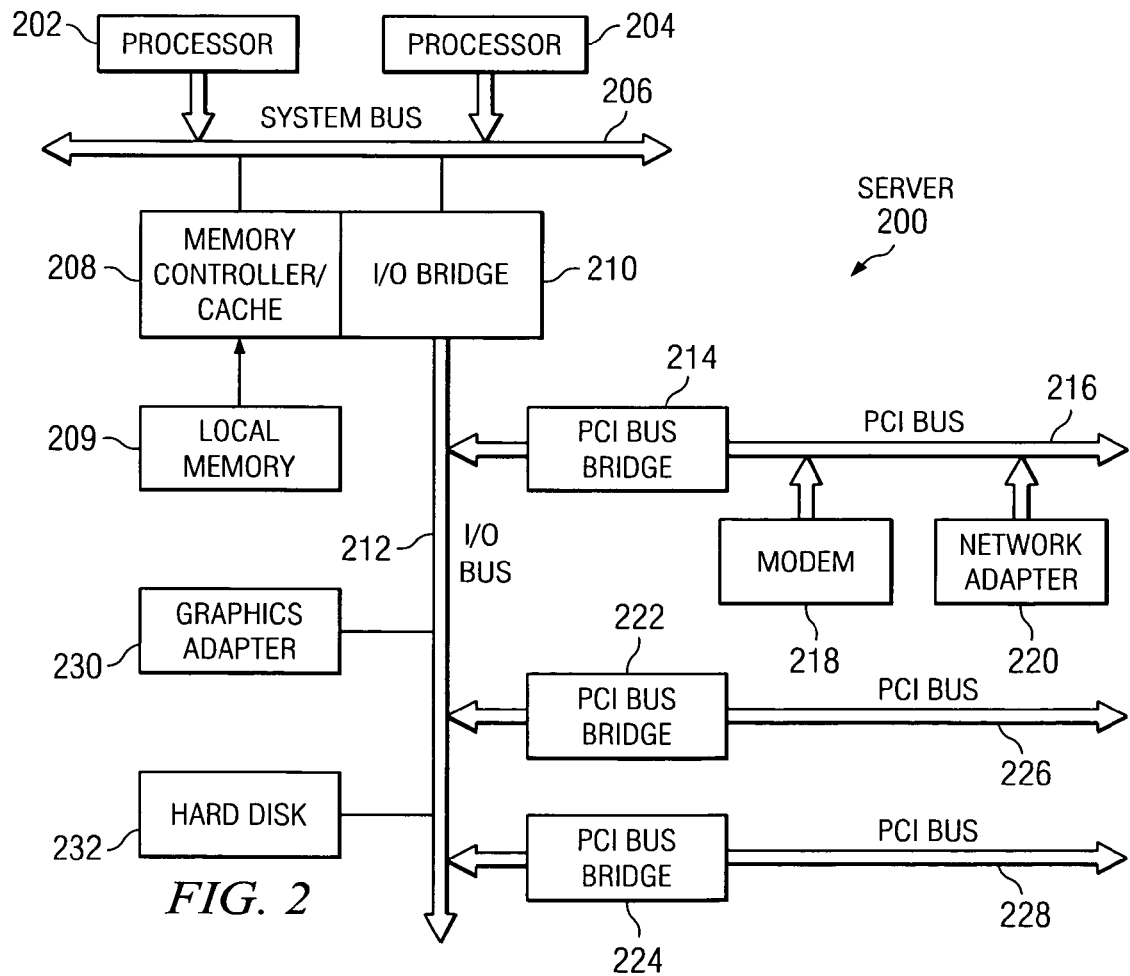
FIG. 2 is a block diagram showing a generalized data processing system that may be used to implement a server component for the system of FIG. 1.

Referring to FIG. 2, a block diagram of a data processing system that may be implemented as a server, such as server 108 of FIG. 1, is depicted in accordance with an embodiment of the invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI bus 216. Typical PCI bus implementations will support four PCI expansion slots or add-in connectors. Communications links may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
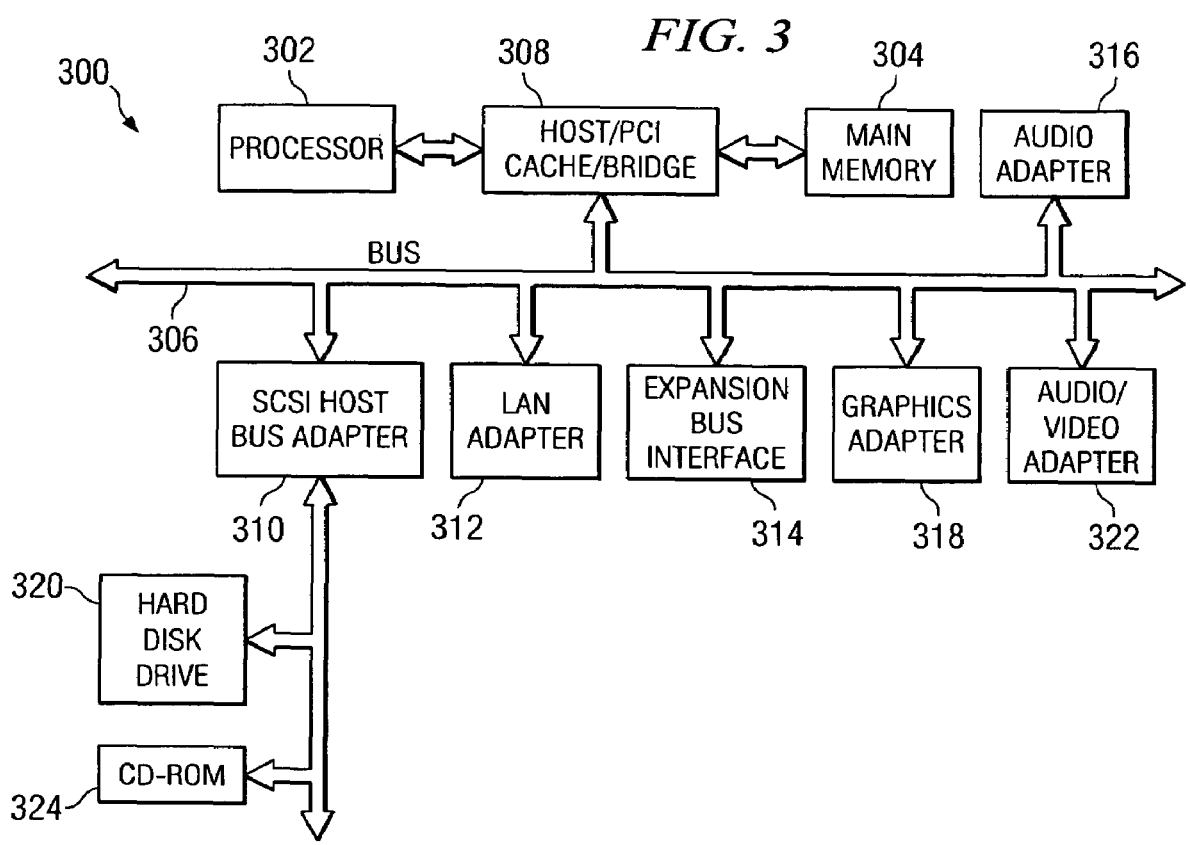
FIG. 3 is a block diagram showing a generalized data processing system that may be used to implement a computer component for the system of FIG. 1.

Referring to FIG. 3, there is shown a block diagram of a generalized data processing system 300 which may be used in implementing computer station 102 of FIG. 1. Data processing system 300 exemplifies a computer, in which code or instructions for implementing the processes of the present invention may be located. Data processing system 300 usefully employs a peripheral component interconnect (PCI) local bus architecture, although other bus architectures such as Accelerated Graphics Port (AGP) and Industry Standard Architecture (ISA) may alternatively be used. FIG. 3 shows a processor 302 and main memory 304 connected to a PCI local bus 306 through a Host/PCI bridge 308. PCI bridge 308 also may include an integrated memory controller and cache memory for processor 302.

Referring further to FIG. 3, there is shown a local area network (LAN) adapter 312, a small computer system interface (SCSI) host bus adapter 310, and an expansion bus interface 314 respectively connected to PCI local bus 306 by direct component connection. Audio adapter 316, a graphics adapter 318, and audio/video adapter 322 are connected to PCI local bus 306 by means of add-in boards inserted into expansion slots. SCSI host bus adapter 310 provides a connection for hard disk drive 320, and also for CD-ROM drive 324.

An operating system runs on processor 302 and is used to coordinate and provide control of various components within data processing system 300 shown in FIG. 3. The operating system may be a commercially available operating system such as Windows XP, which is available from Microsoft Corporation. Instructions for the operating system and for applications or programs are located on storage devices, such as hard disk drive 320, and may be loaded into main memory 304 for execution by processor 302.

Referring to FIG. 4, there is shown a succession of steps for a procedure in accordance with an embodiment of the invention. At step 402, one seeking directions to a specified destination submits a request therefor to a Directions Provider. At step 404, requested directions are sent to the requestor from the Directions Provider. As indicated by step 406, the requester is also sent annotations pertaining to the directions and the specified destination from an annotations repository. As stated above, the repository may alternatively be managed and controlled by a Directions Provider, or by an entity independent therefrom.

Step 408 of FIG. 4 indicates that the requestor uses the directions from the Directions Provider. At step 410, the requestor prepares and sends annotations to the repository that are based on his or her experience with the directions. As stated above, storage and retrieval of annotations in the repository can be regulated by rules selected or modified by the requester.

In accordance with step 412, if annotations from the requestor do not include any corrections to the directions, the procedure of FIG. 4 is ended. Otherwise, the corrections are made as shown by step 414, and then the procedure ends.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing travel directions over a selected network, said method comprising the steps of:
    sending a request for directions regarding a specified destination from a requestor to a Directions Provider;
    retrieving said requested directions and furnishing them to said requestor;
    generating annotations associated with said furnished directions in accordance with a set of rules, and sending said generated annotations to said requestor;
    selectively sending annotations provided by said requestor in regard to said furnished directions to a central repository, wherein said annotations provided by said requestor are added to annotations previously contained in said repository, said previously contained annotations being used to generate said annotations sent to said requestor, and said annotations provided by said requestor including one or more corrections to said furnished directions and a numerical rating of the accuracy of said furnished directions;
    enabling said requestor to dynamically access direction corrections and ratings contained in said repository; and
    establishing a profile of preferences of said requestor, for use in connection with furnishing directions to said requestor, wherein said profile of preferences includes trusted submitters, types of directions, a listing of specific websites that provide directions, and a listing of services for use in accessing and inputting annotations.

2. A computer program product in a computer readable medium for providing travel directions over a selected network, said computer program product comprising:
    first instructions for sending a request for directions regarding a specified destination from a requestor to a Directions Provider;
    second instructions for retrieving said requested directions and furnishing them to said requestor;
    third instructions for generating annotations associated with said furnished directions in accordance with a set of rules resulting from one or more decisions made by said requestor, and sending said generated annotations to said requestor;
    fourth instructions for selectively sending annotations provided by said requestor in regard to said furnished directions to a central repository, wherein said annotations provided by said requestor are added to annotations previously contained in said repository, said previously contained annotations being used to generate said annotations sent to said reguestor, and said annotations provided by said requestor including one or more corrections to said furnished directions and a numerical rating of the accuracy of said furnished directions;
    fifth instructions for enabling said requestor to dynamically access direction corrections and ratings contained in said repository; and
    sixth instructions for establishing a profile of preferences of said requestor, for use in connection with furnishing directions to said requestor, wherein said profile of preferences includes trusted submitters, types of directions, a listing of specific websites that provide directions, and a listing of services for use in accessing and inputting annotations.

3. A system for providing travel directions over a selected network, said system comprising the steps of:
    means for sending a request for directions regarding a specified destination from a requestor to a Directions Provider;
    means for retrieving said requested directions and furnishing them to said requestor;
    means for generating annotations associated with said furnished directions in accordance with a set of rules resulting from one or more decisions made by said requestor, and sending said generated annotations to said requestor;
    means for selectively sending annotations provided by said requestor in regard to said furnished directions to a central repository, wherein said annotations provided by said requestor are added to annotations previously contained in said repository, said previously contained annotations being used to generate said annotations sent to said requestor, and said annotations provided by said reguestor including one or more corrections to said furnished directions and a numerical rating of the accuracy of said furnished directions;
    means for enabling said reguestor to dynamically access direction corrections and ratings contained in said repository; and
    means for establishing a profile of preferences of said reguestor, for use in connection with furnishing directions to said reguestor, wherein said profile of preferences includes trusted submitters, types of directions, a listing of specific websites that provide directions, and a listing of services for use in accessing and inputting annotations.

* * * * *